United States Patent [19]

Chen

[11] Patent Number: 5,059,403

[45] Date of Patent: Oct. 22, 1991

[54] METHOD FOR PRODUCING COPPER SULFATE FROM WASTE COPPER-CONTAINING LIQUID

[75] Inventor: Chung C. Chen, Taipei, Taiwan

[73] Assignee: Compeq Manufacturing Co., Ltd., Tao Yuan Hsien, Taiwan

[21] Appl. No.: 620,748

[22] Filed: Dec. 3, 1990

[51] Int. Cl.$^5$ .............................................. C01G 3/10
[52] U.S. Cl. ....................................... 423/24; 423/36; 423/43; 423/45; 204/106; 204/108; 210/665; 210/669; 210/712; 210/737
[58] Field of Search ...................... 423/24, 25, 27, 36, 423/43, 45; 204/106, 108; 210/749, 669, 665, 712, 710, 724, 737

[56] References Cited

U.S. PATENT DOCUMENTS

| | | | |
|---|---|---|---|
| 3,652,265 | 3/1972 | Marschik et al. | 423/36 |
| 3,787,306 | 1/1974 | Senior et al. | 423/144 |
| 4,100,065 | 7/1978 | Etzel | 210/688 |
| 4,210,530 | 7/1980 | Etzel et al. | 210/904 |
| 4,303,704 | 12/1981 | Courduvelis et al. | 210/688 |
| 4,359,376 | 11/1982 | Baczek et al. | 204/242 |
| 4,362,629 | 12/1982 | Senda et al. | 210/912 |
| 4,420,401 | 12/1983 | Kretas et al. | 210/912 |
| 4,572,822 | 2/1986 | Abe et al. | 423/37 |
| 4,770,788 | 9/1988 | Vignola | 210/674 |
| 4,775,480 | 10/1988 | Milton et al. | 210/195.2 |

Primary Examiner—Stanley S. Silverman
Assistant Examiner—Cynthia L. Nessler
Attorney, Agent, or Firm—Miskin & Mandelbaum

[57] ABSTRACT

A method for producing copper sulfate from waste copper-containing liquid including the steps of recovery of acidic and basic copper-containing liquid, and neutralization of the liquid to form crystalline copper sulfate, wherein the ratio of acidic to basic copper-containing liquid, temperature, pH value and the concentration of copper ion in the resultant solution of each step is being controlled such that the solid copper sulfate is obtained in high yield and purity and will have a larger particle size, and at the same time, the filtrate will contain copper ion in a concentration below 0.3 ppm before being expelled to the surroundings.

10 Claims, 4 Drawing Sheets

METHOD FOR PRODUCING COPPER SULFATE FROM WASTE COPPER-CONTAINING LIQUID

BACKGROUND OF THE INVENTION

The present invention relates to a method for producing copper sulfate from waste copper-containing liquid, such as waste liquid formed in the production of PC boards, or formed in washing hardware. More particularly, the present invention relates to a method for producing copper sulfate from waste copper-containing liquid which comprises exactingly controlled conditions and steps so as to reduce the copper content of the waste copper-containing liquid and to increase the yield of the copper sulfate.

Heretofore, the method for treating waste copper-containing liquid (see FIG. 4) includes the step of mixing and neutralizing acidic and basic copper-containing liquid in a tank. After neutralization, the resultant liquid is filtered. The filtrate is directly expelled into the surroundings, and the residue is manually collected into a second tank. An amount of 50% sulfuric acid is added to the second tank for further neutralization of the residue. Thereafter, the resultant liquid is centrifugally dewatered. The liquid portion is directly expelled into the surroundings, and the product residue (copper sulfate) is collected and exposed to sunlight for drying purpose.

The above-mentioned method for treating waste copper-containing liquid is undesirable for causing water pollution due to its high copper content in the post-treated waste copper-containing liquid. Also, the yield and purity of the resultant copper sulfate is rather low.

The following describes and sums up the drawbacks of the conventional method:

a) Direct mixing of acidic and basic copper-containing liquid of high concentration contributes to vigorous reaction and therefore instantaneous rising of temperature, which results in undesirable small particle size of solid copper sulfate. Therefore, when the resultant liquid is filtered and when the filtrate is directly expelled into the surroundings, undersized solid copper sulfate may not be able to be filtered out and removed from the exhausted stream under normal filter condition, resulting in high copper content in the exhausted stream. Also, the loss of solid copper sulfate during filtration represents a lower yield in the product copper sulfate. Moreover, the instantaneous neutralization of acidic and basic copper-containing liquid is readily to produce acidic gases which, if expel to the atmosphere, causes air pollution.

b) As the pH value of the reaction mixture of the acidic and basic copper-containing liquid has not been controlled properly, the concentration of the copper ion ($Cu^{2+}$) of the filtrate obtained from the neutralization is always within the range of from 300-10,000 ppm. This concentration is far beyond the upper limit of standard tolerance.

c) After the first neutralization, the residue is manually collected into another tank. When the residue is being taken out from the tank manually, the remaining filtrate may contaminate the solid residue, leaving impurities in the final crystalline product. These impurities have adverse effect on the quality and purity of the final product.

d) As 50% sulfuric acid is continuously added to the second tank for the second neutralization of the residue, the system has to be dewatered continuously in order to prevent the continuous increment in the total volume of the whole system. As has been mentioned previously, the liquid portion which has been removed from the system is directly expelled to the surroundings, continuous addition of the 50% sulfuric acid represent continuous environmental contamination. Moreover, this has caused adverse effect on the yield of the product copper sulfate, i.e., rendering the yield lower than 50%.

e) During the second neutralization and crystallization procedure, sulfuric acid is added directly to the residue with resultant solution stands overnight to form the crystalline copper sulfate. In this manner, the crystal size of copper sulfate is not uniform, and in fact, the range of the crystal size is rather wide. This is one of the most undesirable aspect in crystallization. Also, the crystalline copper sulfate is readily contaminated with copper hydroxide and/or copper oxide under such conditions. Therefore, the conventional method produces only low purity and quality products. Furthermore, owing to the fact that crystallization takes longer time to complete, the tank for carrying out crystallization is inevitably larger for holding the solution for 16-24 hours. Therefore, the production rate of conventional method is considered low.

f) At the completion of the second neutralization, the resultant liquid is centrifugally dewatered and the liquid portion is expelled to the surroundings directly. This causes not only water pollution but also low yield and purity of the resultant copper sulfate.

g) Finally, when the product residue (copper sulfate) has been collected, it is exposed to sunlight for drying purposes in a conventional manner. In this manner, the oversized copper sulfate crystal may not be dried when undersized and average-sized copper sulfate crystal have been dried. Moreover, the product may be contaminated with dirt when exposed to sunlight. The space for carrying out the exposure operation represents another practical problem.

SUMMARY OF THE INVENTION

It is therefore a primary object of the present invention to provide a method for producing copper sulfate from waste copper-containing liquid, which method mitigates and/or obviates the above-mentioned drawbacks of conventional method.

Another object of the present invention is to provide a method for producing copper sulfate from waste copper-containing liquid, in which the acidic and basic copper-containing liquid is diluted before mixing in order to prevent vigorous reaction and instantaneous rising of temperature. Consequently, the solid copper sulfate thus formed will have a larger particle size. Therefore, when the resultant liquid is filtered, solid copper sulfate will be filtered out and removed from the exhausted stream under normal filter conditions. The present method prevents the loss of solid copper sulfate during filtration and as such a higher yield of the product copper sulfate can be expected.

A further object of the present invention is to provide a method for producing copper sulfate from waste copper-containing liquid, in which the pH value of the reaction mixture of the acidic and basic copper-containing liquid is controlled properly, and the concentration of the copper ion ($Cu^{2+}$) of the filtrate obtained from the neutralization which is to be expelled to the surroundings is controlled properly so as to be within the range of from 0.1–30 ppm by using a ion exchange resin tower, to meet the requirements of the standard tolerance.

Another object of the present invention is to provide a method for producing copper sulfate from waste copper-containing liquid, in which the residue obtained from the first neutralization is washed with deionized water to prevent the solid residue from being contaminated by the remaining filtrate which includes impurities that have adverse effect on the quality and purity of the final product.

A further object of the present invention is to provide a method for producing copper sulfate from waste copper-containing liquid, in which the mother liquor and the addition of sulfuric acid form a closed system to prevent the increment of the total volume of the whole system and to reduce the amount of liquid expelled to the surroundings. Moreover, the present method can enhance the yield of the product copper sulfate.

Another object of the present invention is to provide a method for producing copper sulfate from waste copper-containing liquid, in which temperature of the resultant solution is controlled properly during the second neutralization and crystallization step, so that the crystal size of copper sulfate is uniform, and the time for completion of crystallization takes 40 minutes or less.

A further object of the present invention is to provide a method for producing copper sulfate from waste copper-containing liquid, in which the copper sulfate liquid formed in the second neutralization is used as mother liquor in the crystallization step under a closed system design, such that the liquid portion need not be expelled to the surroundings, to overcome the problem of water pollution as well as to increase the yield and purity of crystalline copper sulfate.

Still another object of the present invention is to provide a method for producing copper sulfate from waste copper-containing liquid, in which crystalline copper sulfate, once collected, is screen-filtered and dewatered by using a dewaterer, so that the product may not be contaminated by dirt.

Additional features and objects which will be apparent from the detailed description of the preferred embodiment, with appropriate reference to the attached drawings, are accomplished by a method for producing copper sulfate from waste copper-containing liquid comprising the steps of:

a) dilution of acidic copper-containing liquid;

b) mixing and neutralizing the diluted acidic copper-containing liquid with a predetermined amount of basic copper-containing liquid such that the temperature of the resultant solution is within the range of 50°–80° C. and the pH value of the resultant solution is within the range of 5–9 and that the concentration of copper ion is within the range of 0.1–30 ppm;

c) filtrating the resultant liquid by centrifugal filtration into filtrate and residue;

d) subjecting the filtrate to an ion exchange resin tower which reduces the concentration of copper ion to below 0.3 ppm for being expelled to the surroundings;

e) treating the residue with deionized water and expelling the used deionized water having a pH value of 7–8 and a concentration of copper ion below 0.1 ppm to the surroundings;

f) further neutralizing and crystallizing the residue by treating the residue with an amount of preheated saturated copper sulfate solution and an amount of sulfuric acid solution having different proportions of sulfuric acid content, with addition of iced water to cool the resultant solution to an ambient temperature;

g) filtrating the resultant solution along with the crystalline copper sulfate formed in step (f) by using a vibrational screen filter;

h) combining the filtrate (a saturated solution of copper sulfate) with the saturated copper sulfate solution for recycle use;

i) periodically treating an amount of the saturated copper sulfate solution with a 10–45% sodium hydroxide solution to form copper hydroxide precipitate and filtrating the resultant solution by centrifugal filtration and treating the filtrate thus obtained by ion-exchange resin prior to being expelled to the surroundings, such that the copper sulfate solution is handled in a closed system; and j) subjecting the crystalline copper sulfate into a dewaterer to form a crude copper sulfate product.

DETAILED DESCRIPTION OF THE PREFERRED EMBODIMENT

Figure 1:
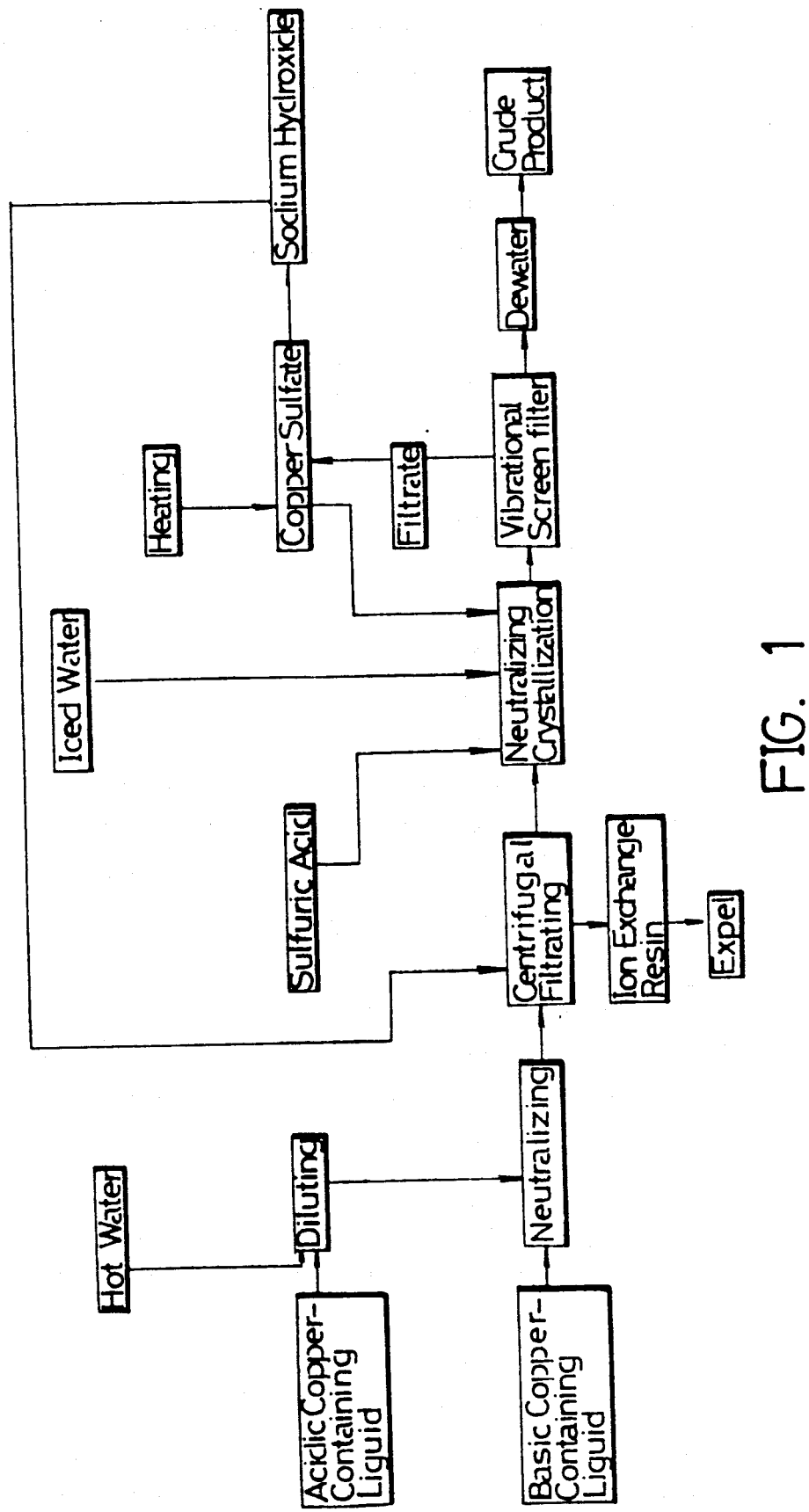
FIG. 1 is a flow chart of the method in accordance with the present invention.

Referring to FIG. 1, a flow chart showing a method for producing copper sulfate from waste copper-containing liquid, in accordance with the present invention, which method includes primarily the steps of recovery of acidic and basic copper-containing liquid, and neutralization of the liquid to form crystalline copper sulfate, wherein the ratio of acidic to basic copper-containing liquid, temperature, pH value and the concentration of copper ion in the resultant solution is controlled such that the solid copper sulfate is obtained in high yield and purity and will have a larger particle size, and at the same time, the filtrate will contain copper ion in a concentration below 0.3 ppm before being expelled to the surroundings.

The following illustrate a best mode for producing copper sulfate from waste copper-containing liquid, which method comprises the steps of:

a) dilution of acidic copper-containing liquid by adding water at 40°–70° C., the ratio of acidic copper-containing liquid to water is within the range of 1:4 to 1:15;

b) mixing and neutralizing the diluted acidic copper-containing liquid with a predetermined amount of basic copper-containing liquid such that the temperature of the resultant solution is within the range of 50°–80° C., the pH value of the resultant solution is within the range of 5–9, and the concentration of copper ion is within the range of 0.1–30 ppm; wherein the solution is agitated at a stirring speed of 600–1200 rpm for 20–40 minutes;

c) filtrating the resultant liquid by centrifugal filtration under a speed of 1800 rpm into filtrate and residue;

d) subjecting the filtrate to an ion exchange resin tower which reduces the concentration of copper ion to below 0.3 ppm for being expelled to the surroundings;

e) treating the residue with deionized water to wash away any impurities, ions or salts, and expelling the used deionized water having a pH value of 7-8 and a concentration of copper ion below 0.1 ppm to the surroundings;

f) further neutralizing and crystallizing the copper sulfate residue to crystalline copper sulfate by treating the residue with an amount of saturated copper sulfate solution preheated to 55°-70° C. to speed up the reaction rate, and an amount of sulfuric acid solution with 98% to 33% of sulfuric acid content (based on the total amount of the resultant solution), with addition of iced water within 20 minutes to cool the resultant solution to an ambient temperature; wherein the solution is agitated at a stirring speed of 300 rpm when the sulfuric acid solution is being added, and wherein the solution is agitated at a stirring speed of 30-60 rpm when iced water is being added;

g) filtrating the resultant solution along with the crystalline copper sulfate formed in step (f) by using a vibrational screen filter, into filtrate (saturated solution of copper sulfate) and crystalline copper sulfate;

h) combining the filtrate (saturated solution of copper sulfate) with the saturated copper sulfate solution feed for recycle use as mother liquor;

i) periodically treating an amount of the saturated copper sulfate solution with a 10-45% sodium hydroxide solution (NaOH) to form copper hydroxide (Cu(OH)$_2$) precipitate so that the volume of the mother liquor can be kept not more than a certain amount, and the pH value of the solution can be maintained at 8-9; and filtrating the resultant solution by centrifugal filtration and treating the filtrate thus obtained by ion-exchange resin prior to being expelled to the surroundings, such that the copper sulfate solution is handled in a closed system; and j) subjecting the crystalline copper sulfate into a dewaterer to form a crude copper sulfate product in a yield >99.5% and a purity >99.8% with a particle size within the range of 0.3-0.8 mm.

Figure 2:
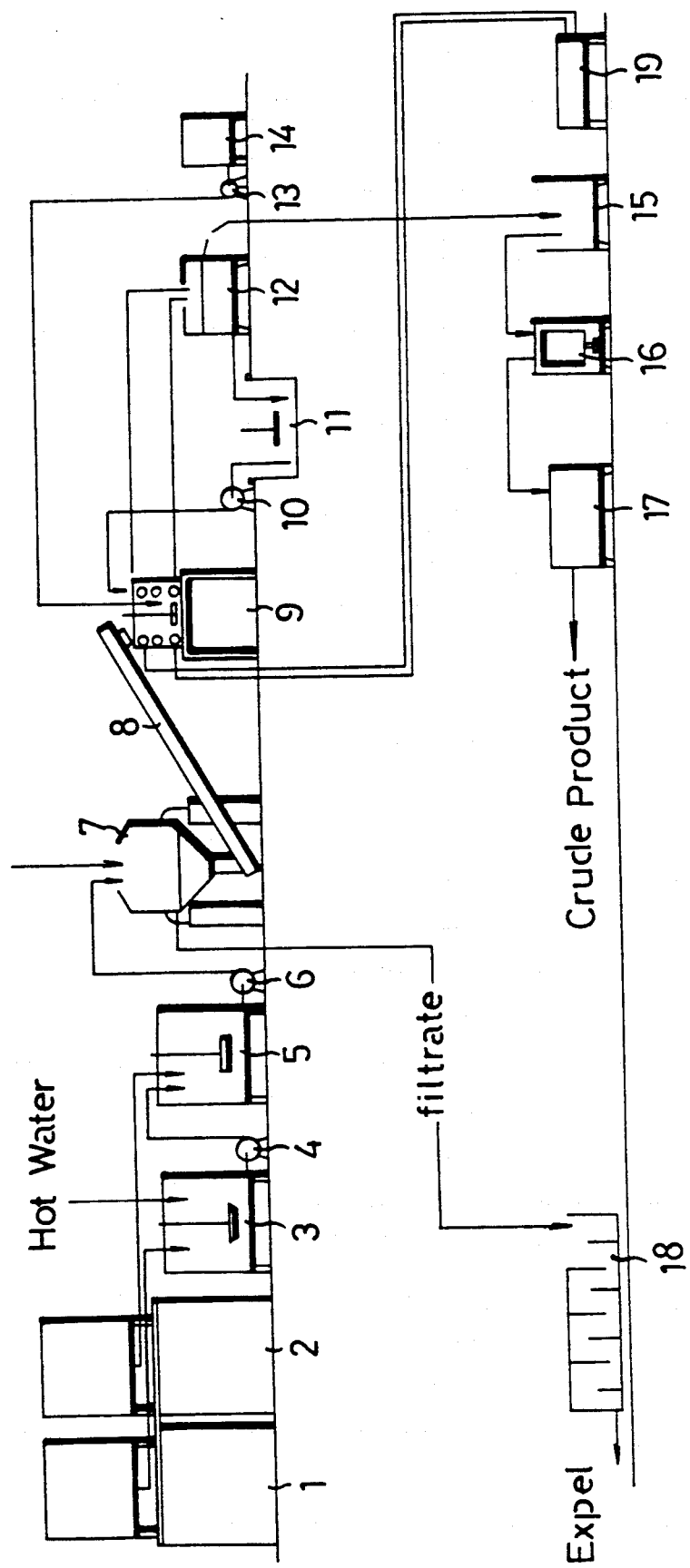
FIG. 2 is a schematic view of the equipment used in the method in accordance with the present invention.

Referring next to FIG. 2, it can be seen a schematic view of the equipment used in the method in accordance with the present invention, which includes a tank for containing acidic copper-containing liquid 1, a tank for containing basic copper-containing liquid 2, a tank for dilution 3, an anti-corrosive pump 4, a tank for neutralization 5, a membrane pump 6, a centrifugal separator 7, a spiral conveyer 8, a tank for neutralizing crystallization 9, an anti-corrosive pump 10, a tank for containing saturated copper sulfate solution 11, a vibrational screen filter 12, an anti-corrosive pump 13, a tank for containing sulfuric acid 14, a tank for containing crude product 15, a dewaterer 16, a tank for containing crude product 17, a tank for sedimentation 18, and ice machine 19.

Figure 3:
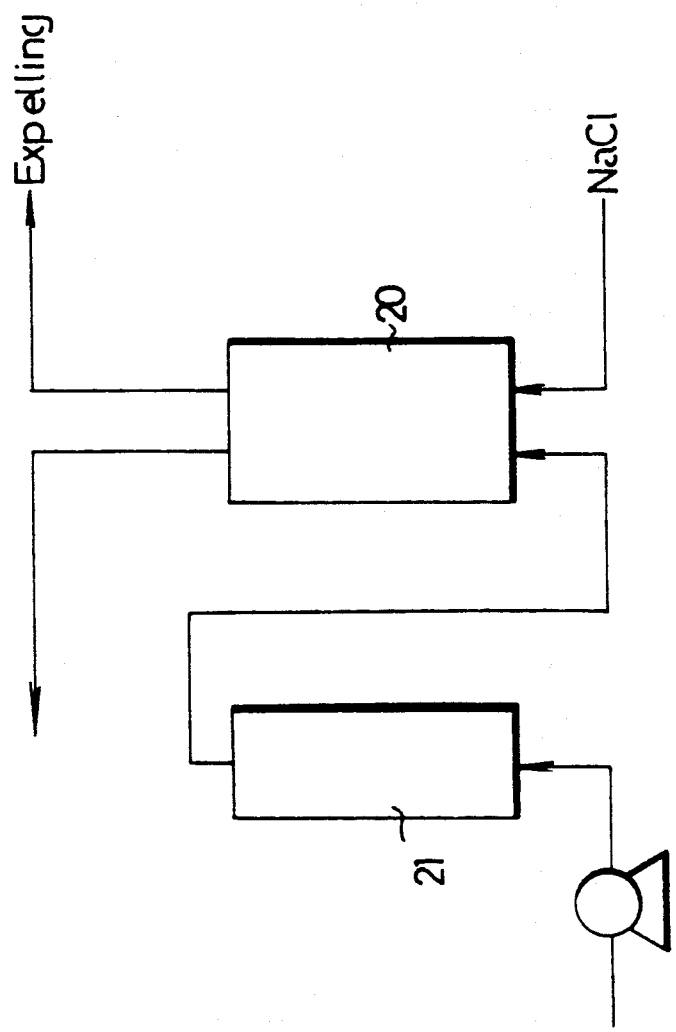
FIG. 3 is a flow chart of schematically showing the operation of the ion-exchange tower in accordance with the present invention.
Figure 4:
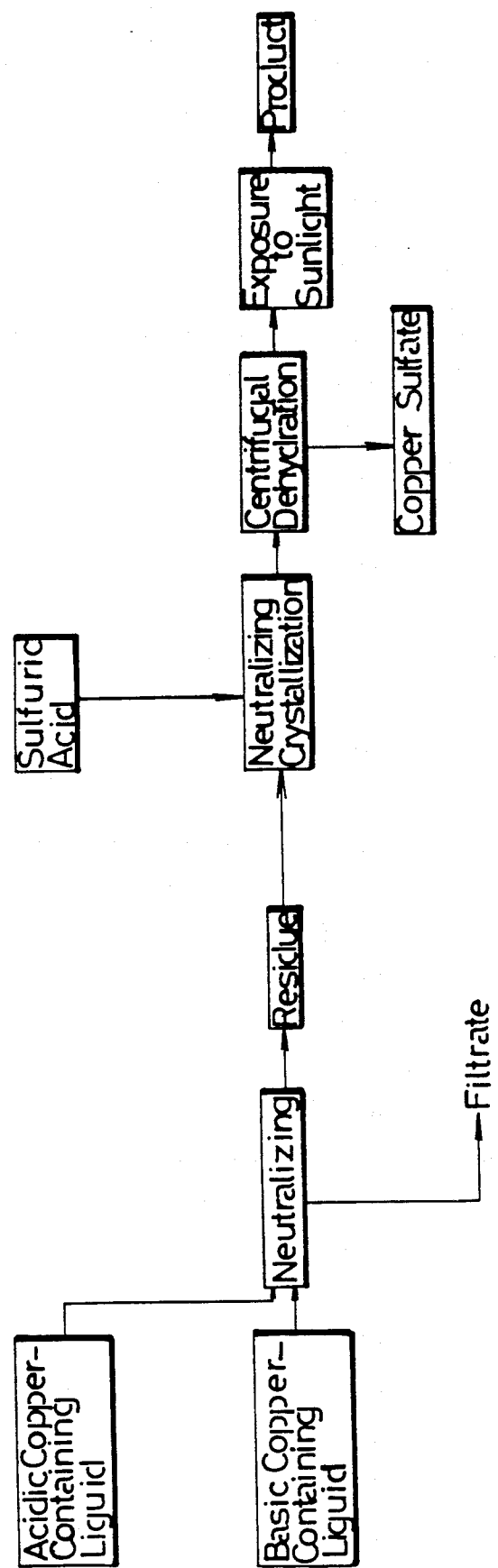
FIG. 4 is a flow chart showing conventional method for producing copper sulfate from waste copper-containing liquid.

Referring to FIG. 3, it can be seen schematically a filter 21 and an ion-exchange resin tower 20. Filtrate from centrifugal separator 7 (see FIG. 1) is designed to pass through the filter 21 prior to entering into the ion-exchange resin tower 20. Saturated sodium chloride solution is fed to the ion-exchange resin tower 20. Since the copper ion in the filtrate is exchangeable with the sodium ion of the sodium chloride solution, the amount and concentration of copper ion is substantially reduced after passing through the ion-exchange resin tower 20. The filtrate, after such treatment, can be expelled to the surroundings with causing any water pollution.

The following two Tables compare the conditions in conventional method and the present method:

TABLE 1

The treated conditions in the first neutralization tank used in conventional method and the present method.

|  | Conventional Method | Present Method |
| --- | --- | --- |
| particle size | <1 um | 2-10 um |
| sedimentation speed | 0.1 cm/hr | 3.5-4.2 cm/hr |
| [Cu$^{2+}$] in filtrate | 300-10,000 ppm | 0.1-30 ppm |
| [Cu$^{2+}$] in exit stream | 300-10,000 ppm | <0.3 ppm |
| Purity of Cu(OH)$_2$ | 70-85% | >98.5% |

TABLE 2

The treated conditions in the second neutralization tank used in conventional method and the present method.

|  | Conventional Method | Present Method |
| --- | --- | --- |
| particle size | 0.05-5 mm | 0.8-2 mm |
| purity | 95% | >99.8% |
| yield | ≈50% | 99.5% |
| Copper content in exit stream | >100,000 ppm | <0.1 ppm |
| operation time | 1 day | 40 min. |

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A method for producing copper sulfate from waste copper-containing liquid comprising the steps of:

a) dilution of acidic copper-containing liquid;

b) mixing and neutralizing the diluted acidic copper-containing liquid with a predetermined amount of basic copper-containing liquid such that the temperature of the resultant solution is within the range of 50°-80° C. and the pH value of the resultant solution is within the range of 5-9 and that the concentration of copper ion is within the range of 0.1-30 ppm;

c) filtrating the resultant liquid by centrifugal filtration into filtrate and residue;

d) subjecting the filtrate to an ion exchange resin tower which reduces the concentration of copper ion to below 0.3 ppm for being expelled to the surroundings;

e) treating the residue with deionized water and expelling the used deionized water having a pH value of 7-8 and a concentration of copper ion below 0.1 ppm to the surroundings;

f) further neutralizing and crystallizing the residue by treating the residue with an amount of preheated saturated copper sulfate solution and an amount of sulfuric acid solution having different proportions of sulfuric acid content, with addition of iced water to cool the resultant solution to an ambient temperature;

g) filtrating the resultant solution along with the crystalline copper sulfate formed in step (f) by using a vibrational screen filter;

h) combining the filtrate (a saturated solution of copper sulfate) with the saturated copper sulfate solution for recycle use;

i) periodically treating an amount of the saturated copper sulfate solution with a 10-45% sodium hydroxide solution to form copper hydroxide precipitate and filtrating the resultant solution by centrifugal filtration and treating the filtrate thus obtained by ion-exchange resin prior to being expelled to the surroundings, such that the copper sulfate solution is handled in a closed system; and j) subjecting the crystalline copper sulfate into a dewaterer to form a crude copper sulfate product.

2. A method as claimed in claim 1, wherein the dilution of acidic copper-containing liquid is completed by adding water at 40°-70° C., and wherein the ratio of acidic copper-containing liquid to water is within the range of 1:4 to 1:15.

3. A method as claimed in claim 1, wherein the solution is agitated at a stirring speed of 600-1200 rpm for 20-40 minutes.

4. A method as claimed in claim 1, wherein the the resultant liquid is filtrated by centrifugal filtration under a speed of 1800 rpm.

5. A method as claimed in claim 1, wherein the residue is treated with an amount of saturated copper sulfate solution preheated to 55°-70° C.

6. A method as claimed in claim 1, wherein the sulfuric acid solution has 98% to 33% of sulfuric acid content based on the total amount of the resultant solution.

7. A method as claimed in claim 1, wherein the solution is agitated at a stirring speed of 300 rpm when the sulfuric acid solution is being added, and wherein the solution is agitated at a stirring speed of 30-60 rpm when iced water is being added.

8. A method as claimed in claim 1, wherein the filtrate (saturated solution of copper sulfate) is combined with the saturated copper sulfate solution feed for recycle use as mother liquor.

9. A method as claimed in claim 1, wherein an amount of the saturated copper sulfate solution is periodically treated with a 10-45% sodium hydroxide solution to form copper hydroxide precipitate such that the volume of the mother liquor is kept not more than a certain amount, and the pH value of the solution is maintained at 8-9.

10. A method as claimed in claim 1, wherein the filtrate passes through a filter prior to entering into a ion-exchange resin tower.

* * * * *